Oct. 16, 1934.  J. A. DODDS  1,977,506
STORAGE BATTERY
Filed Sept. 28, 1932
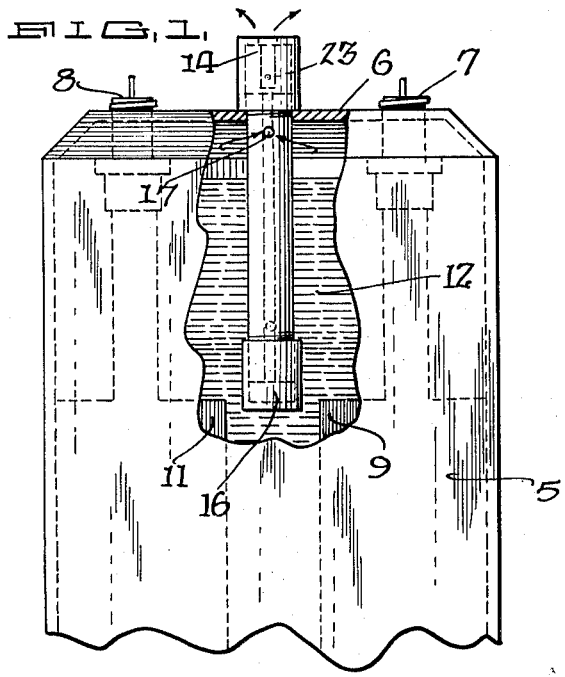
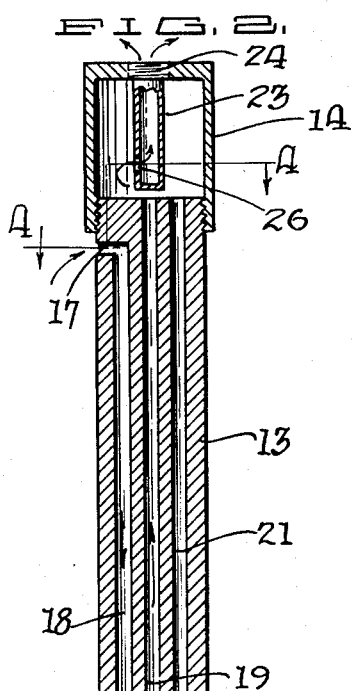
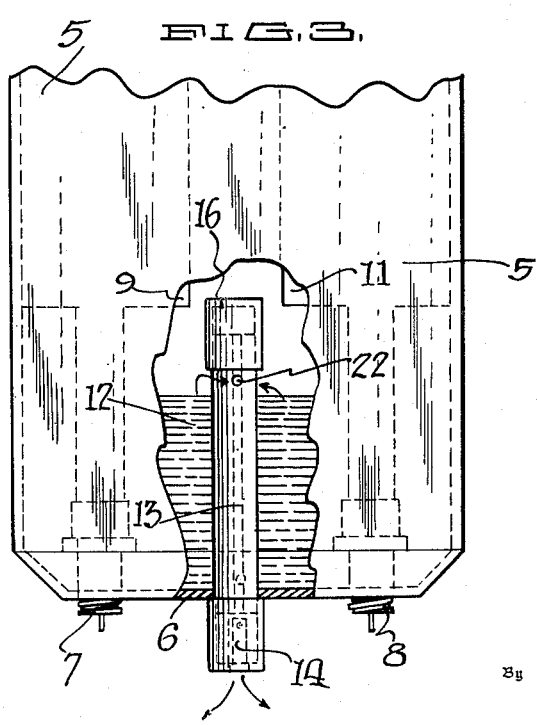
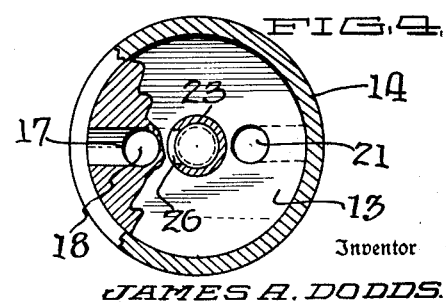
Inventor
JAMES A. DODDS.
By Victor J. Evans & Co.
Attorneys:

UNITED STATES PATENT OFFICE 1,977,506

STORAGE BATTERY

James A. Dodds, San Francisco, Calif.

Application September 28, 1932, Serial No. 635,294

1 Claim. (Cl. 136—177)

This invention relates to improvements in storage batteries and has particular reference to a safety vent for a wet type storage battery.

The principal object of the invention is to provide means whereby the gases arising from the battery may escape irrespective of the position in which the battery may be.

A further object is to provide a trap whereby none of the liquid or electrolyte within the battery can escape, irrespective of the position in which the battery may be placed.

A further object is to produce a device which may be attached to and become a part of any ordinary storage battery.

A still further object is to produce a device which is economical to manufacture.

Other objects and advantages will be apparent during the course of the following description.

In the accompanying drawing forming a part of this specification and in which like numerals are employed to designate like parts throughout the same, Fig. 1 is a fragmentary top section of a storage battery having my invention applied thereto, a portion of the battery being broken away, Fig. 2 is an enlarged detail cross sectional view of my device, Fig. 3 is a view similar to Fig. 1, showing the battery in an inverted position, and Fig. 4 is an enlarged detail cross sectional view on the line 4—4 of Fig. 2.

In using a storage battery, it is important that a vent be provided in the battery casing so that gases arising from chemical action within the battery may escape, otherwise these gases may create a pressure sufficient to explode the case. These batteries all employ an electrolyte usually consisting of sulphuric acid and distilled water. It is, therefore, evident that if the battery for any reason is violently handled or tipped upside-down, some of this electrolyte would be spilled through the vent and due to its acid nature, would burn or otherwise destroy most materials with which it contacts. Applicant has provided a safety attachment which permits this venting of the gas by traps and holds back the escape of any electrolyte which might try to follow the gas in its exit.

In the accompanying drawing wherein for the purpose of illustration is shown a preferred embodiment of my invention, the numeral 5 designates the casing of a battery having a closed top 6 through which terminals 7 and 8 protrude. Within the casing 5 are battery plates 9 and 11, which are submerged in an electrolyte 12. When the battery is in an upright position this electrolyte covers the plates 9 and 11 and may extend upwardly to any desired height. In the top 6 I insert a tube 13 having threaded ends upon which are screwed an outer trap 14 and an inner trap 16. In the tube 13 I form a port 17 which communicates with a passage 18, which passage communicates with the interior of the trap 16. A passage 19 communicates at its opposite ends with the interior of the traps 14 and 16. A passage 21 communicates with the interior of the trap 14 and with a port 22. The port 22 is located adjacent the trap 16 while the port 17 is located adjacent the trap 14. Within the trap 14 is a tube 23 having an outlet 24 and an inlet 26. This inlet 26 is in close proximity to the tube 13.

The result of this construction is that when the battery is in the position shown in Fig. 1, gas arising from the electrolyte will enter the port 17 passing through the passage 18, into the trap 16, thence through the passage 19, into the trap 14, thence through the inlet 26 into the tube 23 and out through the outlet 24, thus escaping from the interior of the battery to the atmosphere. Should the battery be violently handled so as to cause the electrolyte to splash around in the casing, some of the electrolyte may enter the port 17 in which event it will flow into the trap 16 where it will remain. It is hardly likely that enough electrolyte will be splashed into the port 17 to fill the trap 16. Should this, however, occur and the trap become filled more liquid entering the trap will cause the same to rise in the tube 19 and the gas will continue to push this electrolyte up the tube 19 until it enters the trap 14, from which point it will flow through the passage 21 and escape back into the battery.

If the battery is inverted as shown in Fig. 3, gas will escape through the port 22, thence through the passage 21 into the trap 14, thence through the inlet 26 into the tube 23 and thence through the outlet 24. Any liquid which might be carried by this gas into the trap 14 will be confined between the bottom of the trap (considering the device is inverted) and the inlet 26 of the tube 23. As soon as the battery is again righted, any electrolyte within the trap 14 will be immediately drained back through the passage 21 into the battery, some of the liquid might pass down through the passage 19 into the trap 16. The capacities of the traps 14 and 16 are sufficient to take care of the escape of gas over the electrolyte after the contents of the tubes have spilled thereinto.

It will therefor be evident that with my device the storage battery cannot be turned in any position which would result in the spilling of the electrolyte.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:—

In combination with a storage battery cell comprising a closed casing containing an electrolyte, a vent for the casing comprising a closed liquid trap outside the casing having an opening at the top thereof in communication with the outside atmosphere and a second closed trap inside the casing and immersed in the electrolyte when the cell is in an upright position, the two traps being mechanically connected by a member having three passageways, the said member also having two ports within the casing opening to the outer surface of the member, one at the upper portion of the member adjacent the outer trap and the other at the lower portion of the member adjacent the inner trap, one of the said passageways being in communication with the two traps, the second passageway connecting the top port with the inner trap and the third passageway connecting the lower port with the outer trap, the amount of electrolyte being such that when the casing is turned up-side-down, the port adjacent the inner trap is above the electrolyte.

JAMES A. DODDS.